US012675510B2

(12) United States Patent
Chockalingam et al.

(10) Patent No.: US 12,675,510 B2
(45) Date of Patent: Jul. 7, 2026

(54) SYSTEMS AND METHODS FOR PROVIDING USER INTERFACES TO CONVERSE WITH A CORPUS OF ELECTRONIC DOCUMENTS VIA A LARGE LANGUAGE MODEL

(71) Applicant: Instabase, Inc., Dover, DE (US)

(72) Inventors: Alagu Chockalingam, Dover, DE (US); Aayush Dutt, Dover, DE (US); Varun Jain, Dover, DE (US); Timothy Serkes, Dover, DE (US); Hariharan Thirugnanam, Bangalore (IN); Subash Chandran Thirumaran, Dover, DE (US)

(73) Assignee: Instabase, Inc., Dover, DE (US)

( * ) Notice: Subject to any disclaimer, the term of this patent is extended or adjusted under 35 U.S.C. 154(b) by 162 days.

(21) Appl. No.: 18/317,623

(22) Filed: May 15, 2023

(65) Prior Publication Data

US 2024/0386037 A1 Nov. 21, 2024

(51) Int. Cl.

| | |
|---|---|
| ***G06V 30/412*** | (2022.01) |
| ***G06F 16/332*** | (2019.01) |
| ***G06F 40/40*** | (2020.01) |

(52) U.S. Cl.

CPC .......... *G06F 16/3328* (2019.01); *G06F 40/40* (2020.01); *G06V 30/412* (2022.01)

(58) Field of Classification Search

CPC ...... G06F 16/3328; G06F 40/40; G06F 40/56; G06V 30/412

See application file for complete search history.

(56) References Cited

U.S. PATENT DOCUMENTS

| | | | |
|---|---|---|---|
| 5,848,184 | A | 12/1998 | Taylor |
| 5,898,795 | A | 4/1999 | Bessho |
| 7,689,431 | B1 | 3/2010 | Carmel |
| 7,720,318 | B1 | 5/2010 | Phinney |
| 7,725,423 | B1 | 5/2010 | Pricer |

(Continued)

FOREIGN PATENT DOCUMENTS

WO 2025240072 A1 11/2025

OTHER PUBLICATIONS

Chaudhuri et al., "Extraction of type style-based meta-information from imaged documents", IJDAR (2001) 3: 138-149. (Year: 2001).

(Continued)

*Primary Examiner* — Hai Phan
*Assistant Examiner* — Nathan Tengbumroong
(74) *Attorney, Agent, or Firm* — Esplin & Associates, PC

(57) ABSTRACT

Systems and methods for providing user interfaces to converse with a corpus of electronic documents via a large language model are disclosed. Exemplary implementations may: present a user interface configured to obtain entry of user input from a user to select one or more documents to be provided as input to a large language model for an individual conversation; responsive to selection of the individual conversation, provide an individual query as a prompt to the large language model; obtain and present an individual reply from the large language model; determine an individual document from the one or more documents that is relevant to the individual reply; present the individual document in a particular portion of the user interface; and/or perform other steps.

20 Claims, 7 Drawing Sheets

(56)     References Cited

U.S. PATENT DOCUMENTS

| 8,254,681 B1 | 8/2012 | Poncin | |
| 9,275,030 B1 | 3/2016 | Fang | |
| 9,607,058 B1 | 3/2017 | Gupta | |
| 9,760,566 B2 | 9/2017 | Heck | |
| 10,679,089 B2 | 6/2020 | Annis | |
| 11,315,353 B1 | 4/2022 | Cahn | |
| 11,494,551 B1 | 11/2022 | Espinas | |
| 11,934,439 B1* | 3/2024 | Horesh | G06F 40/284 |
| 2002/0064316 A1 | 5/2002 | Takaoka | |
| 2004/0181749 A1 | 9/2004 | Chellapilla | |
| 2004/0223648 A1 | 11/2004 | Hoene | |
| 2005/0289182 A1 | 12/2005 | Pandian | |
| 2008/0148144 A1 | 6/2008 | Tatsumi | |
| 2008/0212901 A1 | 9/2008 | Castiglia | |
| 2008/0291486 A1 | 11/2008 | Isles | |
| 2009/0076935 A1 | 3/2009 | Knowles | |
| 2009/0132590 A1 | 5/2009 | Huang | |
| 2012/0072859 A1 | 3/2012 | Wang | |
| 2012/0204103 A1 | 8/2012 | Stevens | |
| 2014/0200880 A1 | 7/2014 | Neustel | |
| 2014/0214732 A1 | 7/2014 | Carmeli | |
| 2015/0012422 A1 | 1/2015 | Ceribelli | |
| 2015/0169951 A1 | 6/2015 | Khintsitskiy | |
| 2015/0169995 A1 | 6/2015 | Panferov | |
| 2015/0278197 A1 | 10/2015 | Bogdanova | |
| 2015/0295955 A1 | 10/2015 | Cholkar | |
| 2016/0014299 A1 | 1/2016 | Saka | |
| 2016/0275526 A1 | 9/2016 | Becanovic | |
| 2017/0344630 A1 | 11/2017 | Frosst | |
| 2018/0189592 A1 | 7/2018 | Annis | |
| 2018/0329890 A1 | 11/2018 | Ito | |
| 2018/0349388 A1 | 12/2018 | Skiles | |
| 2019/0005138 A1* | 1/2019 | Andreica | G10L 15/1815 |
| 2019/0286900 A1 | 9/2019 | Pepe, Jr. | |
| 2020/0036658 A1 | 1/2020 | Elango | |
| 2020/0089946 A1 | 3/2020 | Mallick | |
| 2020/0104359 A1 | 4/2020 | Patel | |
| 2020/0302166 A1 | 9/2020 | Meier | |
| 2020/0364343 A1 | 11/2020 | Atighetchi | |
| 2021/0258448 A1 | 8/2021 | Yuusuke | |
| 2021/0409352 A1 | 12/2021 | Arunachalam | |
| 2022/0035864 A1 | 2/2022 | Morton | |
| 2022/0078139 A1 | 3/2022 | Sreenivasan | |
| 2022/0210098 A1 | 6/2022 | Zhang | |
| 2022/0398858 A1 | 12/2022 | Cahn | |
| 2023/0162292 A1 | 5/2023 | Sundararaman | |
| 2023/0223016 A1* | 7/2023 | Konam | G06F 40/284 |
| | | | 704/231 |
| 2023/0334889 A1 | 10/2023 | Cahn | |
| 2023/0403244 A1 | 12/2023 | Blandin | |
| 2024/0007694 A1 | 1/2024 | Riley | |
| 2024/0070489 A1* | 2/2024 | Dang | G06N 5/04 |
| 2024/0211473 A1 | 6/2024 | Crabtree | |
| 2024/0267345 A1 | 8/2024 | Esnault | |
| 2024/0296295 A1* | 9/2024 | Russell | G06F 40/56 |
| 2024/0305589 A1 | 9/2024 | Dan | |
| 2024/0323150 A1 | 9/2024 | Dan | |
| 2024/0333666 A1 | 10/2024 | Desmond | |
| 2024/0354436 A1* | 10/2024 | Mukherjee | G06F 16/3344 |
| 2024/0356871 A1 | 10/2024 | Brewer | |
| 2024/0356881 A1 | 10/2024 | Wheeler | |
| 2024/0362286 A1* | 10/2024 | He | G06F 16/93 |
| 2025/0200100 A1 | 6/2025 | Hintz | |

OTHER PUBLICATIONS

Doermann et al., "Image Based Typographic Analysis of Documents", Proceedings of 2nd International Conference on Document Analysis and Recognition, pp. 769-773, 1993 IEEE. (Year: 1993).

Shafait ("Document image analysis with OCRopus," IEEE 13th International Mulititopic Conference; Date of Conference: Dec. 14-15, 2009) (Year: 2009) 6 pages.

Singh et al. (A Proposed Approach for Character Recognition Using Document Analysis with OCR, Second InternationalConference on Intelligent Computing and Control Systems: Date of Conference: Jun. 14-15, 2018) (Year: 2018) 6 pages.

Slavin et al., "Matching Digital Copies of Documents Based on OCR", 2019 XXI International Conference Complex Systems: Control and Modeling Problems (CSCMP), pp. 177-181, published on Sep. 1, 2019. (Year: 2019).

Manqing Mao et al., "Multi-User Chat Assistant (MUCA): a Framework Using LLMs to Facilitate Group Conversation," Jan. 10, 2024. (Year: 2024).

* cited by examiner

200

| | |
|---|---|
| Effectuate A Presentation Of A First User Interface | 202 |
| Responsive To Selection Of An Individual Conversation, Provide An Individual Query As A Prompt To A Large Language Model | 204 |
| Obtain An Individual Reply From The Large Language Model, Wherein The Individual Reply Is Presented In The First User Interface | 206 |
| Determine An Individual Document From The One Or More Documents That Is Relevant To The Individual Reply | 208 |
| Present The Individual Document In The Fourth Portion Of The First User Interface | 210 |

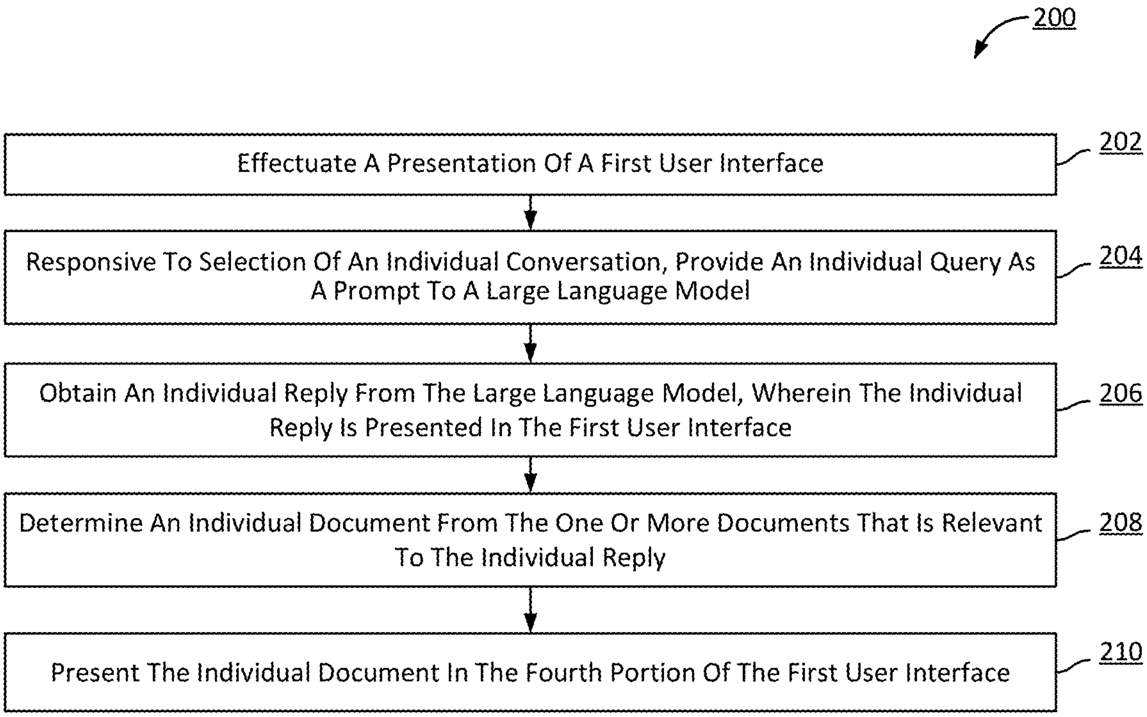

BIG BANK
P O Box 1
Somecity, XY

John Johnson
123 Main Street
Anytown, USA

_32_

Date: 02/01/XX through 02/08/XX
Account Number:    000 00 300 02 001

CUSTOMER SERVICE INFORMATION
Website       bigbank.com
Service center    1-800-123-4567
International calls   1-123-456-7890

_33_

| CHECKING SUMMARY | AMOUNT |
|---|---|
| **Beginning Balance** | **$1000.00** |
| Deposits and Additions | 100.00 |
| Checks Paid | -50.00 |
| ATM & Debit Card Withdrawals | -200.00 |
| Electronic Withdrawals | 0 |
| Fees | -10.00 |
| **Ending Balance** | **$840.00** |

CHECKS PAID

| CHECK NUMBER | DATE PAID | AMOUNT |
|---|---|---|
| 1234 | 02/03 | $50.00 |

TRANSACTION DETAIL

| DATE | DESCRIPTION | AMOUNT |
|---|---|---|
| 02/04 | ATM withdrawal | $200.00 |

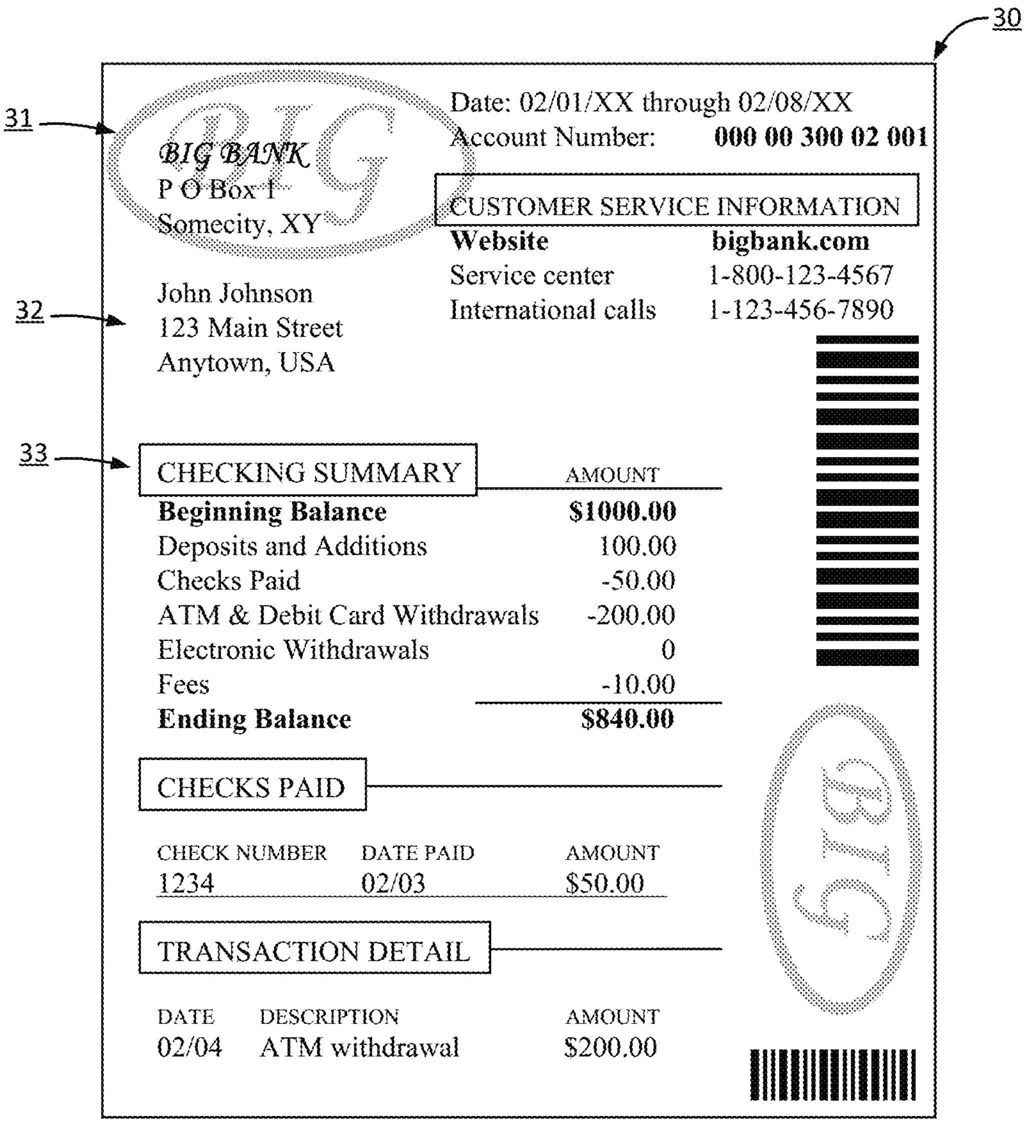

_Fig. 3A_

SYSTEMS AND METHODS FOR PROVIDING USER INTERFACES TO CONVERSE WITH A CORPUS OF ELECTRONIC DOCUMENTS VIA A LARGE LANGUAGE MODEL

FIELD OF THE DISCLOSURE

The present disclosure relates to systems and methods for providing user interfaces to converse with a corpus of electronic documents via a large language model.

BACKGROUND

Extracting information from electronic documents is known. Presenting information in user interfaces is known. Large language models are known.

SUMMARY

One aspect of the present disclosure relates to a system configured for providing user interfaces to converse with a corpus of electronic documents via a large language model. The system may include one or more hardware processors configured by machine-readable instructions. The system may be configured to present a user interface configured to obtain entry of user input from a user to select one or more documents to be provided as input to a large language model for an individual conversation. The system may be configured to, responsive to selection of the individual conversation, provide an individual query as a prompt to the large language model. The system may be configured to obtain and present an individual reply from the large language model. The system may be configured to determine an individual document from the one or more documents that is relevant to the individual reply. The system may be configured to present the individual document in a particular portion of the user interface, and/or perform other steps.

Another aspect of the present disclosure relates to a method for providing user interfaces to converse with a corpus of electronic documents via a large language model. The method may include presenting a user interface configured to obtain entry of user input from a user to select one or more documents to be provided as input to a large language model for an individual conversation. The method may include, responsive to selection of the individual conversation, providing an individual query as a prompt to the large language model. The method may include obtaining and presenting an individual reply from the large language model. The method may include determining an individual document from the one or more documents that is relevant to the individual reply. The method may include presenting the individual document in a particular portion of the user interface. The method may include performing other steps.

As used herein, any association (or relation, or reflection, or indication, or correspondency) involving servers, processors, client computing platforms, documents, formats, blocks of content, characters, conversations, presentations, extracted information, user interfaces, user interface elements, portions, queries, replies, prompts, models, representations, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2 illustrates a method of providing user interfaces to converse with a corpus of electronic documents via a large language model, in accordance with one or more implementations.

FIG. 3A illustrates an exemplary electronic document as may be used in a system configured for providing user interfaces to converse with a corpus of electronic documents via a large language model, in accordance with one or more implementations.

DETAILED DESCRIPTION

Figure 1:
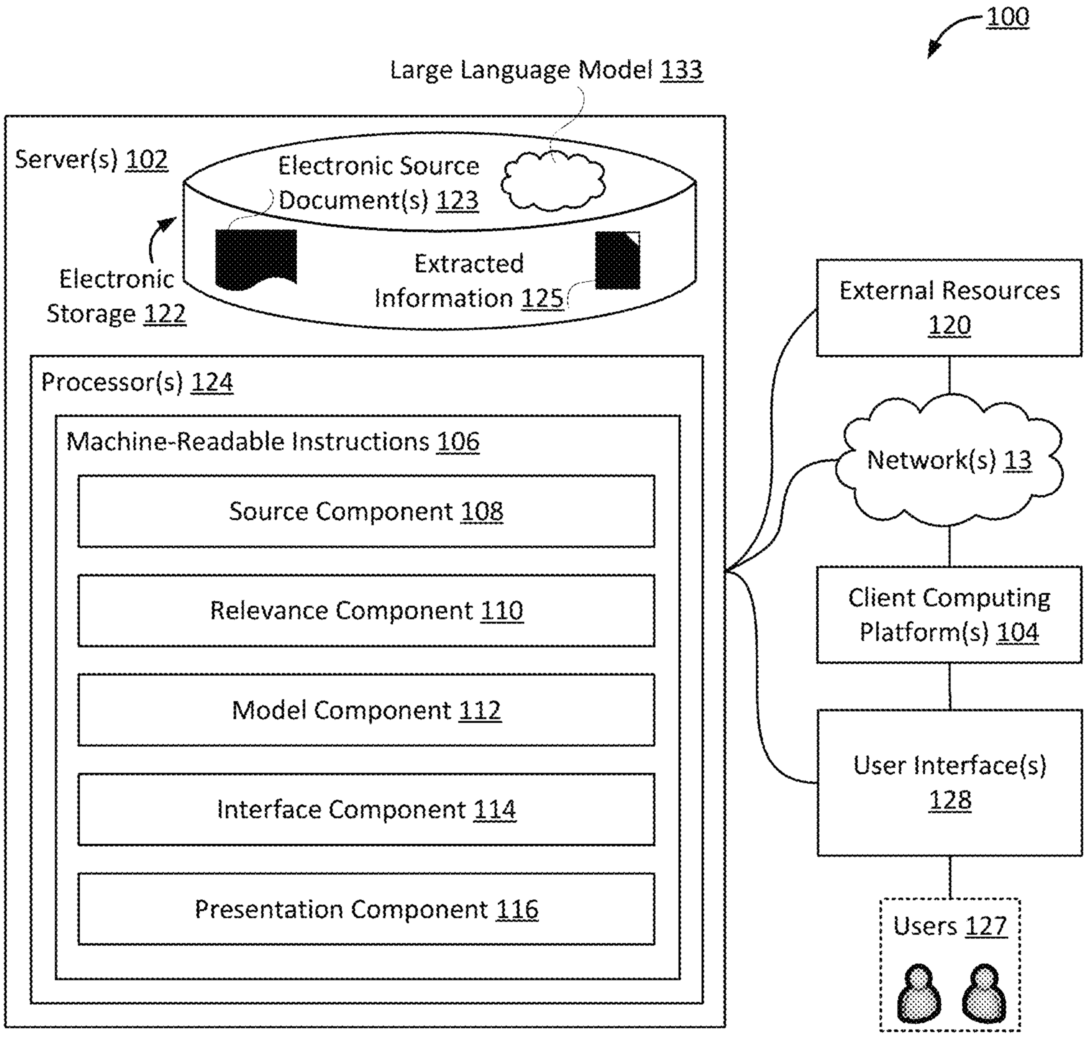
FIG. 1 illustrates a system configured for providing user interfaces to converse with a corpus of electronic documents via a large language model, in accordance with one or more implementations.

FIG. 1 illustrates a system 100 configured for providing user interfaces to converse with a corpus of electronic documents via a large language model, in accordance with one or more implementations. In some implementations, system 100 may include one or more servers 102, one or more client computing platforms 104, one or more user interfaces 128, external resources 120, a large language model (LLM) 133, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 127 may access system 100 via client computing platform(s) 104. In some implementations, individual users may be associated with individual client computing platforms 104. For example, a first user may be associated with a first client computing platform 104, a second user may be associated with a second client computing platform 104, and so forth. In some implementations, individual user interfaces 128 may be associated with individual client computing platforms 104. For example, a first user interface 128 may be associated with a first client computing platform 104, a second user interface 128 may be associated with a second client computing platform 104, and so forth.

Server(s) 102 may be configured by machine-readable instructions 106. Machine-readable instructions 106 may include one or more instruction components. The instruction components may include computer program components. The instruction components may include one or more of a source component 108, a relevance component 110, a model component 112, an interface component 114, a presentation component 116, and/or other instruction components.

Source component 108 may be configured to obtain and/or retrieve documents, including but not limited to electronic source documents, including scanned images, captured photographs, and/or other documents in electronic format. As used herein, the terms “electronic document” and “electronic source document”, and derivatives thereof, may be used interchangeably. One or more documents may form a corpus of electronic documents. By way of non-limiting example, the electronic formats of the electronic documents may be one or more of Portable Document Format (PDF), Portable Network Graphics (PNG), Tagged Image File Format (TIF or TIFF), Joint Photographic Experts Group (JPG or JPEG), and/or other formats. Electronic documents may be stored and obtained as electronic files. In some implementations, an electronic document may be a scanned and/or photographed version of an original paper document and/or otherwise physical original document, or a copy of an original digital document. In some implementations, original documents may have been published, generated, produced, communicated, and/or made available by a business entity and/or government agency. Business entities may include corporate entities, non-corporate entities, and/or other entities. For example, an original document may have been communicated to customers, clients, and/or other interested parties. By way of non-limiting example, a particular original document may have been communicated by a financial institution to an account holder, by an insurance company to a policy holder or affected party, by a department of motor vehicles to a driver, etc. In some implementations, original documents may include financial reports, financial records, and/or other financial documents.

As used herein, documents may be referred to as “source documents” when the documents are originally published, generated, produced, communicated, and/or made available, or when the documents are copies thereof. Alternatively, and/or simultaneously, documents may be referred to as “source documents” when the documents are a source of human-readable information, or a basis or a container for human-readable information.

In some implementations, one or more electronic formats used for the electronic documents may encode visual information that represents human-readable information. For example, the human-readable information may be positioned on multiple line positions. In some implementations, the visual information may include one or more blocks of content, such as, e.g., a first block of content, a second block of content, and so forth. Blocks of content may represent human-readable information, such as characters, words, dates, amounts, phrases, etc. In a particular case, different blocks of content may be (positioned) on different lines or line positions. For example, the first block of content may be positioned above or below the second block of content. For example, a third block of content may be positioned above or below a fourth block of content. As an example, two characters could be vertically aligned if they are positioned on the same line, so neither is above or below the other. For example, the elements in a row of a table may be vertically aligned, and the elements in a column of a table may be horizontally aligned.

In some implementations, one or more electronic formats used for the electronic documents may be such that, upon presentation of the electronic documents through user interfaces 128, the presentation(s) include human-readable information. By way of non-limiting example, human-readable information may include any combination of numbers, letters, diacritics, symbols, punctuation, and/or other information (jointly referred to herein as “characters”), which may be in any combination of alphabets, syllabaries, and/or logographic systems. In some implementations, characters may be grouped and/or otherwise organized into groups of characters (e.g., any word in this disclosure may be an example of a group of characters, particularly a group of alphanumerical characters). For example, a particular electronic source document 123 may include multiple groups of characters, such as, e.g., a first group of characters, a second group of characters, a third group of characters, a fourth group of characters, and so forth. Groups of characters may be included in blocks of content.

The electronic formats may be suitable and/or intended for human readers, and not, for example, a binary format that is not suitable for human readers. For example, the electronic format referred to as “PDF” is suitable and intended for human readers when presented using a particular application (e.g., an application referred to as a “pdf reader”). In some implementations, particular electronic source document 123 may represent one or more of a bank statement, a financial record, a photocopy of a physical document from a government agency, and/or other documents. For example, a particular electronic source document 123 may include a captured and/or generated image and/or video. For example, a particular electronic source document 123 may be a captured and/or generated image. The electronic documents obtained by source component 108 may have a particular size and/or resolution.

By way of non-limiting example, FIG. 3A illustrates an exemplary electronic source document 30 as may be used in system 100 (of FIG. 1), in accordance with one or more implementations. Exemplary electronic source document 30 may be part of a corpus of electronic documents. Exemplary electronic source document 30 may represent a bank statement from a particular bank, intended for a particular account holder, regarding a particular account of the particular account holder with the particular bank. Exemplary electronic source document 30 includes many content blocks representing human-readable information, including various familiar elements for a bank statement, such as, by way of non-limiting example, the bank's name, address, and logo of the bank as indicated by an indicator 31, an account holder's name and address as indicated by an indicator 32, an overview of checking account information (including, for example, beginning account balance for a particular period and ending account balance for the particular period) as indicated by an indicator 33, and other familiar elements of a bank statement.

Figure 3B:
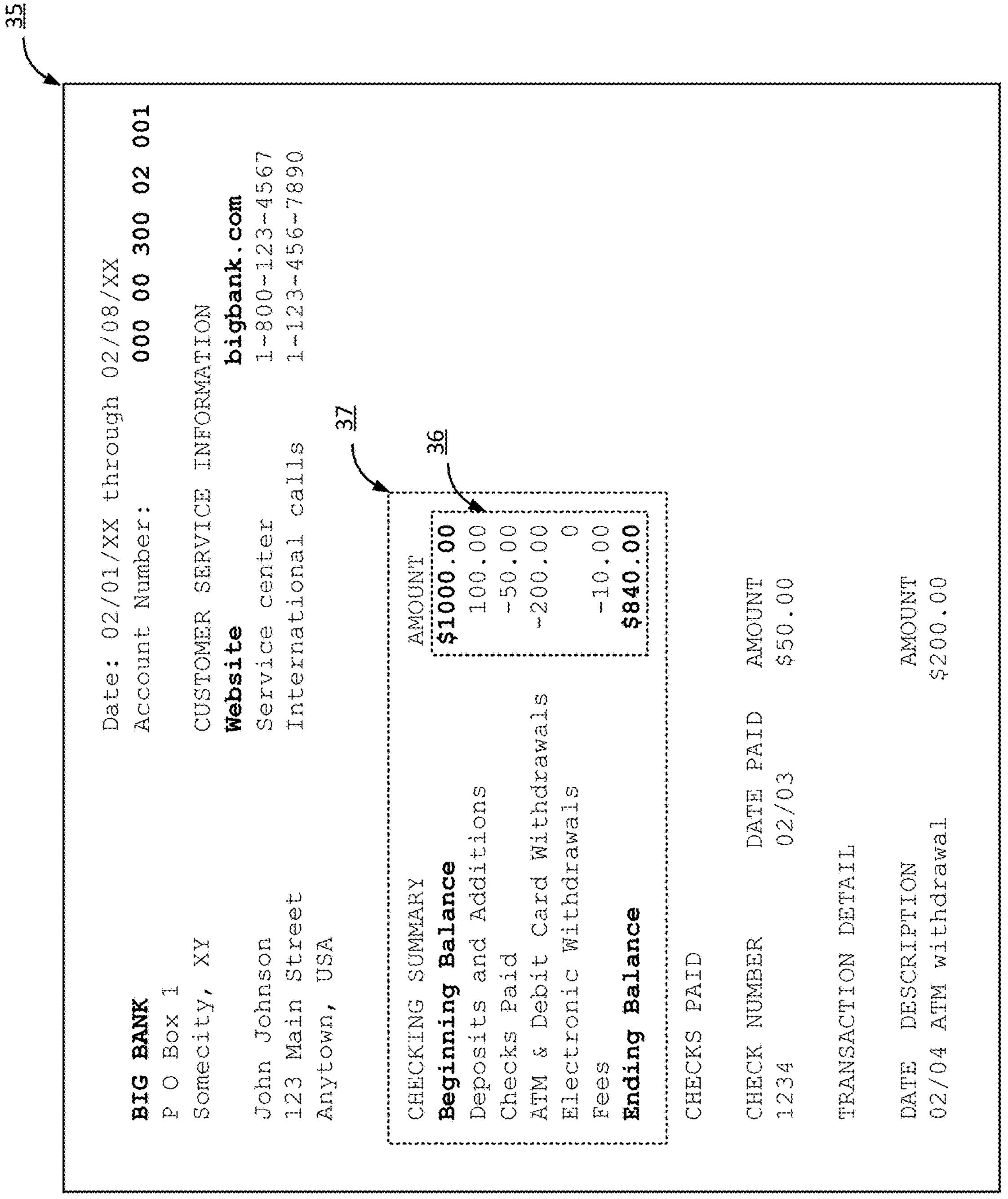
FIG. 3B illustrates an exemplary document as may be used in a system configured for providing user interfaces to converse with a corpus of electronic documents via a large language model, in accordance with one or more implementations.

By way of non-limiting example, FIG. 3B illustrates an exemplary document 35 as may be used in system 100 (of FIG. 1), in accordance with one or more implementations. Exemplary document 35 may be part of a corpus of electronic documents. In some implementations, exemplary document 35 may have been created from exemplary electronic source document 30 in FIG. 3A, by converting that document to a text-based document format. The sets of characters in exemplary document 35 may correspond to content blocks in exemplary electronic source document 30 in FIG. 3A. For example, a column 36 of right-aligned sets of characters (in this case, numerical information such as amounts of currency) may correspond to certain content blocks in exemplary electronic source document 30 in FIG. 3A. As depicted, column 36 is part of a table 37. For example, the set of characters "Beginning Balance" form a row label, the set of characters "AMOUNT" form a column label, and the set of characters "$1000.00" form the attribute value for this row. Likewise, in table 37, "$840.00" is the attribute value (or amount) for "Ending Balance".

Referring to FIG. 1, presentation component 116 may be configured to generate, effectuate, and/or present user interfaces 128 on client computing platforms 104 to users 127. For example, interface component 112 may be configured to present a particular user interface 128 on a particular client computing platform 104 to a particular user. In some implementations, particular user interface 128 may be configured to obtain entry of user input from a particular user. For example, the user input may select one or more documents. The one or more documents may be provided as input to large language model 133 for a particular conversation between the particular user and the one or more documents. As used herein, a "conversation" includes one or more sets of queries (or questions) and replies (or responses) between a user and large language model 133 regarding one or more documents. The one or more documents may form a corpus of electronic documents. Alternatively, and/or simultaneously, the user input may enter queries, from the particular user, regarding some or all of the one or more documents, e.g., as previously selected. Alternatively, and/or simultaneously, the user input may navigate between a set of different portions or sections of particular user interface 128. For example, particular user interface 128 may include one or more portions or sections. In some implementations, a portion or section may be a (sub) window, a tab, a frame, and/or another part of particular user interface 128. In some implementations, particular user interface 128 may include at least four portions. In other implementations, particular user interface 128 may include at least three portions. In yet other implementations, particular user interface 128 may include at least two portions. In yet other implementations, particular user interface 128 may include at least one portion.

Figure 4:
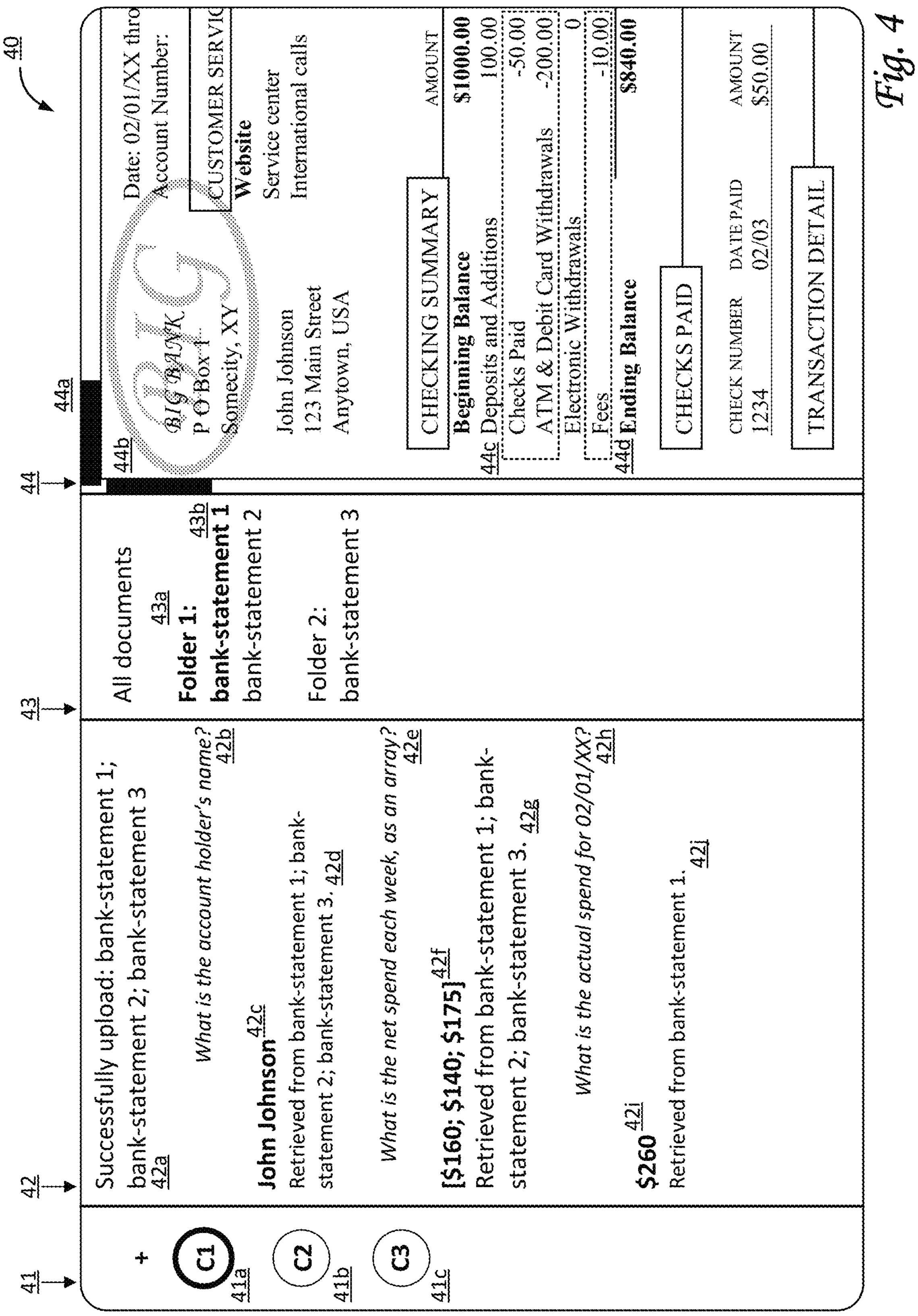
FIG. 4 illustrates an exemplary user interface as may be used in a system configured for providing user interfaces to converse with a corpus of electronic documents via a large language model, in accordance with one or more implementations.

By way of non-limiting example, FIG. 4 illustrates an exemplary user interface 40 as may be used by system 100. As depicted, exemplary user interface 40 includes a first portion 41, a second portion 42, a third portion 43, and a fourth portion 44. In this example, some or all of these portions are presented to the user at the same time. In some implementations, first portion 41 may be configured to select an individual conversation from a set of (on-going) conversations (which may also be referred to as "projects" or "sessions" in some cases). For example, as depicted, a conversation 41*a*, labeled "C1", is currently selected. Additional conversations include a conversation 41*b* (labeled "C2") and a conversation 41*c* (labeled "C3"). Additionally, in this example, second portion 42 may be configured to enter, by a particular user, one of more queries and to present, to the particular user, one or more replies to the one or more queries. The queries and replies may form a conversation. Second portion 42 may be specific to the particular conversation as selected in first portion 41. Second portion 42 may reflect at least a portion of a particular conversation history (also referred to as "chat history", which may be persistent over time, so a particular user can come back to a conversation at some point in the future and continue the conversation). In some implementations, second portion 42 may include a notification 42*a* regarding modifications (e.g., additions or deletions of documents) of the current corpus of electronic documents. For example, as depicted here, the user added three documents as the corpus, including "bank-statement 1", "bank-statement 2", and "bank-statement 3". For example, the document "bank-statement 1" may be the same as or similar to exemplary electronic source document 30 from FIG. 3A (which is a bank statement regarding a particular account of a particular account holder). Assume that documents "bank-statement 2" and "bank-statement 3" (not depicted) are similar electronic source documents for different weeks or months, but for the same account holder and account.

Referring to FIG. 4, second portion 42 may include a query 42*b* (as entered by the user), and a corresponding reply 42*c* (provided by large language model 133). As depicted, query 42*b* is a question: "What is the account holder's name?" This question has been provided as a prompt (or input) to large language model 133. Reply 42*c* is "John Johnson", which is retrieved from (or based on) multiple documents, as indicated by a notification 42*d*. Second portion 42 may include a query 42*e* and a corresponding reply 42*f*, retrieved from multiple documents as indicated by a notification 42*g*. As depicted, query 42*e* is a question: "What is the net spend each week, as an array?" This question has been provided as a prompt (or input) to large language model 133. Reply 42*f* is "[$160; $140; $165]", formatted as an array. For the document "bank-statement 1" (which may be exemplary electronic source document 30 from FIG. 3A), the net spend may be determined as the difference between the beginning balance and the ending balance on the statement, or $160. The source for determining the net spend for the other two documents is not shown, though apparently the results are $140 and $175. Note that reply 42*f* has been formatted for presentation as requested. By way of non-limiting example, queries may request formatting and/or rendering in different styles, as different objects (e.g., as a table, or a column, or a JavaScript Object Notation (JSON) object, etc.), and/or other types of presentation of information.

Second portion 42 may include a query 42*h* and a corresponding reply 42*i*, retrieved from a single document ("bank-statement 1") as indicated by a notification 42*j*. As depicted, query 42*h* is a question: "What is the actual spend for 02/01/XX?" This question has been provided as a prompt (or input) to large language model 133. Reply 42*i* is "$260".

The actual spend may be determined, by way of non-limiting example, as the absolute sum of the negative attributes in the “AMOUNT” column, here $260 (or $50+$200+$10).

Referring to FIG. 4, in some implementations, third portion 43 may be configured to select, by a particular user, an individual folder of documents that are included in a particular corpus. In some implementations, third portion 43 may be configured to select, by the particular user, an individual document that is included in a particular corpus. In some implementations, more information regarding the selection made in third portion 44 may be presented in fourth portion 44. As depicted in FIG. 4, the current corpus includes three documents located in two folders. A folder indication 43*a* illustrates a particular selected folder. A document indication 43*b* illustrates a particular selected document (in this case “bank-statement 1”). In some implementations, a particular folder or document may be emphasized in portion 43 based on one or more determinations by relevance component 110. For example, the emphasized document may have been determined to be relevant to a particular reply in second portion 42. For example, part of a document (e.g., a word, a phrase, a sentence, a caption, a number, etc.) may be emphasized to indicate provenance with regard to a particular reply in second portion 42.

Referring to FIG. 4, in some implementations, fourth portion 44 may be configured to present, to the particular user, more information regarding the selection made in third portion 44. For example, fourth portion 44 may present the single document as selected in third portion 43. As depicted, fourth portion 44 includes a horizontal scrolling bar 44*a* and a vertical scrolling bar 44*b* since the entirety of the selected document (here, the same as or similar to exemplary electronic source document 30 from FIG. 3A) is too large to fit in portion 44.”). In some implementations, a particular document may be presented in portion 44 based on one or more determinations by relevance component 110. For example, the presented document may have been determined to be relevant to a particular reply in second portion 42. In some cases, a section of the presented document may be emphasized by one or more of an indicator 44*c* and/or an indicator 44*d* (shown here as dotted rectangles) based on one or more determinations by relevance component 110. For example, the emphasized sections as indicated by indicator 44*c* and indicator 44*d* may have been determined to be relevant to a particular reply such as reply 42*i* in second portion 42. In some cases, the emphasized sections as indicated by indicator 44*c* and indicator 44*d* may depict the provenance of reply 42*i* in second portion 42. Large language model 133 may be configured to provide provenance-related information for its output and/or replies, to reduce and/or prevent so-called hallucinations.

Referring to FIG. 1, in some implementations, presentation component 116 may be configured to present one or more graphical user interface elements on one or more user interfaces 128, e.g., responsive to a selection by a user (e.g., through user input received by interface component 114). In some implementations, presentation component 116 may present particular information in a particular portion of particular user interface 128. Referring to FIG. 4, for example, presentation component 116 may present replies to queries in second portion 42. Referring to FIG. 4, for example, presentation component 116 may present an individual document in fourth portion 44. User interfaces 128 may be configured to enable users 127 to control (e.g., through user input) the extraction of information from one or more documents. Extraction of information may be performed by large language model 133 (e.g., using the one or more documents as input and/or context). In some implementations, the extraction of information may be user-directed, i.e., controlled by an individual one of users 127 through user input into, e.g., second portion 42 of particular user interface 128.

Figure 5:
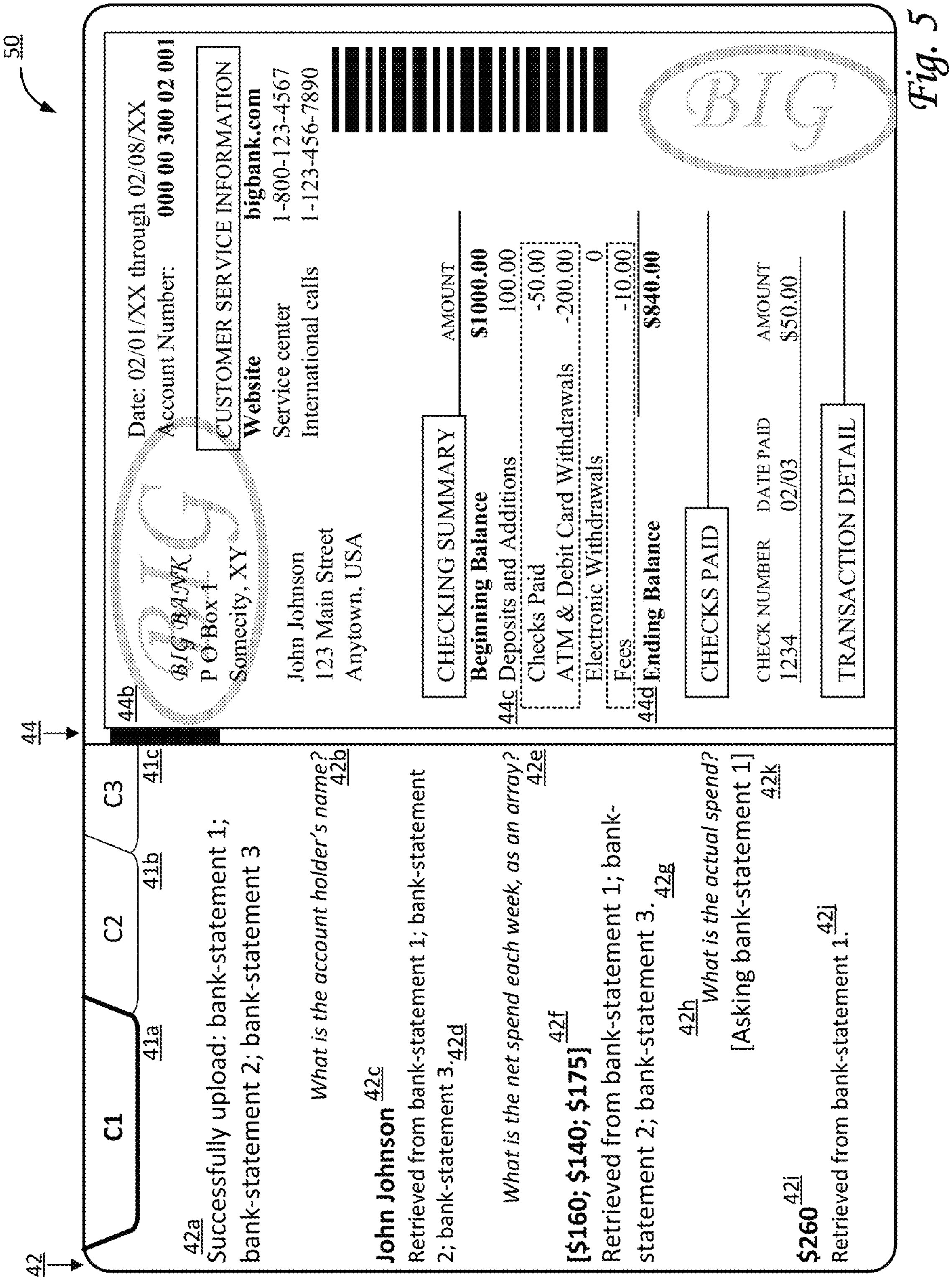
FIG. 5 illustrates an exemplary user interface as may be used in a system configured for providing user interfaces to converse with a corpus of electronic documents via a large language model, in accordance with one or more implementations.

By way of non-limiting example, FIG. 5 illustrates an exemplary user interface 50 as may be used by system 100. As depicted, exemplary user interface 50 includes elements of first portion 41 from FIG. 4 (allowing a selection between conversation 41*a*, conversation 41*b*, and conversation 41*c*, through tabs), a second portion 42, and a portion similar to fourth portion 44 from FIG. 4. In some implementations, second portion 42 may indicate whether a particular query was scoped to a subset of the current corpus. For example, in exemplary user interface 50, query 42*h* is scoped as indicated by a notification 42*k* (“Asking bank-statement 1”), to a single document “bank-statement 1”.

Figure 6:
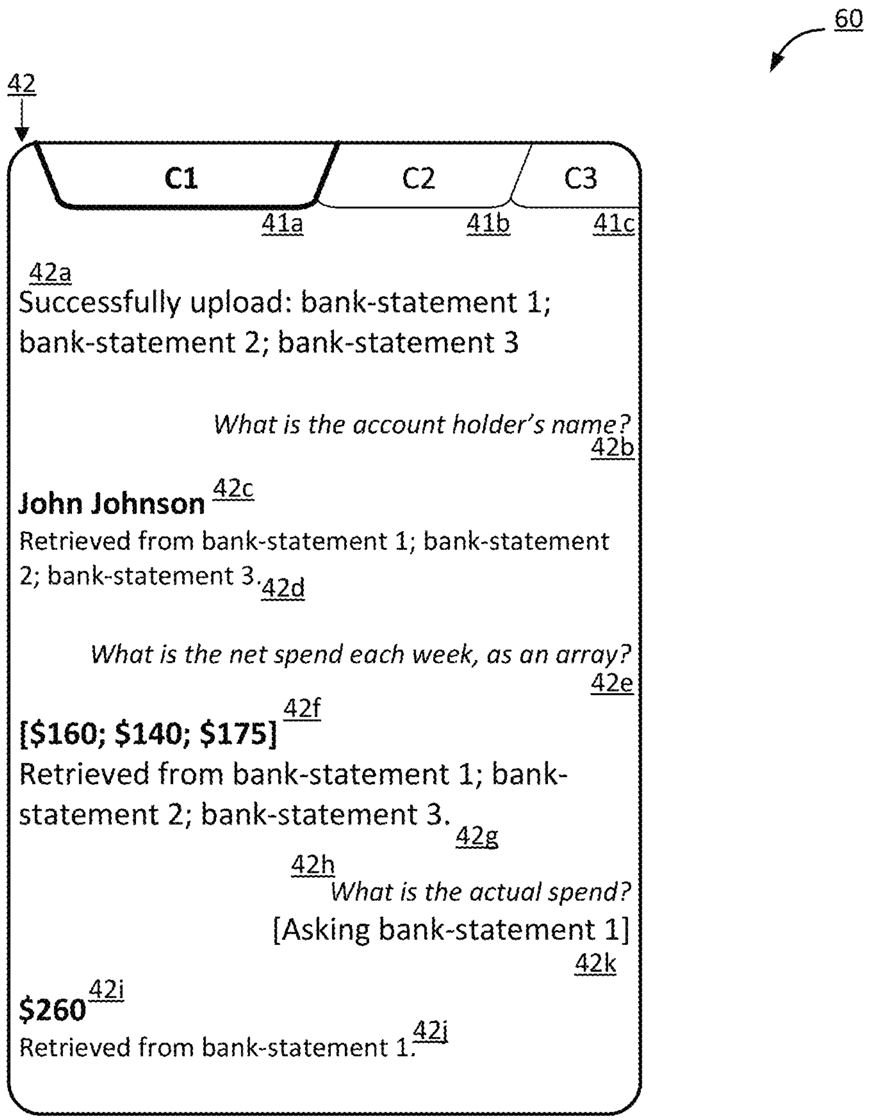
FIG. 6 illustrates an exemplary user interface as may be used in a system configured for providing user interfaces to converse with a corpus of electronic documents via a large language model, in accordance with one or more implementations.

By way of non-limiting example, FIG. 6 illustrates an exemplary user interface 60 as may be used by system 100. As depicted, exemplary user interface 60 includes elements of first portion 41 from FIG. 4 (allowing a selection between conversation 41*a*, conversation 41*b*, and conversation 41*c*, through tabs), and a second portion 42. In some implementations, second portion 42 may indicate whether a particular query was scoped to a subset of the current corpus. For example, in exemplary user interface 60, query 42*h* is scoped as indicated by a notification 42*k* (“Asking bank-statement 1”), to a single document “bank-statement 1”.

Referring to FIG. 1, model component 112 may be configured to obtain, access, use, and/or fine-tune a large language model (LLM) 133. In some implementations, large language model 133 may have been trained on at least a million documents. In some implementations, large language model 133 may have been trained on at least 100 million documents. In some implementations, large language model 133 may include and/or be based on a neural network using over a billion parameters and/or weights. In some implementations, large language model 133 may include and/or be based on a neural network using over a 100 billion parameters and/or weights. In some implementations, large language model 133 may be based on Generative Pre-trained Transformer 3 (GPT3). In some implementations, large language model 133 may be based on ChatGPT, as developed by OpenAI™. In some implementations, large language model 133 may be derived from Generative Pre-trained Transformer 3 (GPT3) or a successor of Generative Pre-trained Transformer 3 (GPT3). In some implementations, model component 112 may be configured to fine-tune large language model 133 through a set of documents (e.g., training documents). In some cases, the training documents may include financial documents, including but not limited to bank statements, insurance documents, mortgage documents, loan documents, and/or other financial documents. Large language model 133 may be able to determine and/or use whether information is formatted in a column, or a row, or a table. Accordingly, information elements in a column, or a row, or a table may be contextually and/or semantically linked and/or otherwise connected such that large language model 133 may extract information from a particular document based on knowledge of the formatted information in the particular document. In some implementations, model component 112 may be configured to obtain and/or present replies to queries from large language model 133.

Referring to FIG. 1, interface component 114 may be configured to provide documents to large language model 133 as input and/or context. For example, interface component 114 may provide one or more particular documents to large language model 133 as input and/or context for queries and/or other types of extraction of information. In some implementations, interface component 114 provides input documents to large language model 133 for extraction of information, including but not limited to user-directed extraction of information. In some implementations, interface component 114 may be configured to provide queries as prompts to large language model 133. In some implementations, interface component 114 may be configured to obtain replies to queries from large language model 133. For example, a user may enter a query to cause large language model 133 to extract the net amount spent in a particular week from exemplary electronic source document 30 in FIG. 3A (e.g., based on the difference between beginning and ending balance, here $160). For example, a user may enter a query to cause large language model 133 to extract the actual amount spent in a particular week from exemplary electronic source document 30 in FIG. 3A (e.g., based on the difference between beginning and ending balance, and any deposits or additions—or alternatively on the absolute sum of negative attributes in the amount column-such that here, the actual amount spent would be $260). In some implementations, interface component 114 may provide input and/or prompts to large language model 133 after or subsequent to fine-tuning of large language model 133 by model component 112.

Referring to FIG. 1, relevance component 110 may be configured to determine one or more documents from a corpus of electronic documents, the one or more documents being relevant to a particular query and/or a particular corresponding reply. In some implementations, relevance component 110 may be configured to make one or more determinations regarding a corpus of electronic documents. For example, if a particular reply is based on information from a particular document, relevance component 110 may notify a user thereof, such as with notifications 42*d*, 42*g*, and 42*j* in FIG. 4. In some implementations, relevance component 110 may be configured to make one or more determinations regarding an individual document in a corpus of electronic documents. For example, if a particular reply is based on information from one or more sections of a document, relevance component 110 may notify a user thereof, such as with indicators 44*c* and 44*d* in FIG. 4. In some implementations, relevance component 110 may be configured to provide provenance for the contents of replies to queries. In some implementations, determinations by relevance component 110 may be based on output and/or meta-information from large language model 133. By way of non-limiting example, in some implementations, relevance component 110 may be configured to determine metrics and/or scores for individual parts of a document (e.g., a word, a phrase, a sentence, a caption, a number, etc.) regarding particular topics, questions, and/or queries. In some implementations, relevance component 110 may use large language model 133 to make these determinations. Relevance component 110 may aggregate these metrics and/or scores to assign a relevance (e.g., expressed as a number or a percentage) to the individual parts of a document regarding individual topics, questions, and/or queries. Notifying and/or emphasizing (parts of) documents may be based on this assigned relevance.

As used herein, the term "extract" and its variants refer to the process of identifying and/or interpreting information that is included in one or more documents, whether performed by determining, measuring, calculating, computing, estimating, approximating, interpreting, generating, and/or otherwise deriving the information, and/or any combination thereof. In some implementations, extracted information may have a semantic meaning, including but not limited to opinions, judgement, classification, and/or other meaning that may be attributed to (human and/or machine-powered) interpretation. For example, in some implementations, some types of extracted information need not literally be included in a particular electronic source document, but may be a conclusion, classification, and/or other type of result of (human and/or machine-powered) interpretation of the contents of the particular electronic source document. In some implementations, the extracted information may have been extracted by one or more extraction engines. For example, a particular extraction engine (referred to as an OCR engine) may use a document analysis process that includes optical character recognition (OCR). For example, a different extraction engine (referred to as a line engine) may use a different document analysis process that includes line detection. For example, another extraction engine (referred to as a barcode engine) may use a document analysis process that includes detection of barcodes, Quick Response (QR) codes, matrices, and/or other machine-readable optical labels. Alternatively, and/or simultaneously, in some implementations, the extracted information may have been extracted by a document analysis process that uses machine-learning (in particular deep learning) techniques. For example, (deep learning-based) computer vision technology may have been used. For example, a convolutional neural network may have been trained and used to classify (pixelated) image data as characters, photographs, diagrams, media content, and/or other types of information. In some implementations, the extracted information may have been extracted by a document analysis process that uses a pipeline of steps for object detection, object recognition, and/or object classification. In some implementations, the extracted information may have been extracted by a document analysis process that uses one or more of rule-based systems, regular expressions, deterministic extraction methods, stochastic extraction methods, and/or other techniques. In some implementations, particular document analysis processes that were used to extract the extracted information may fall outside of the scope of this disclosure, and the results of these particular document analysis processes, e.g., the extracted information, may be obtained and/or retrieved by a component of system 100.

In some implementations, server(s) 102, client computing platform(s) 104, and/or external resources 120 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 128 may be configured to facilitate interaction between users 127 and system 100 and/or between users 127 and client computing platforms 104. For example, user interfaces 128 may provide an interface through which users may provide information to and/or receive information from system 100. In some implementations, user interface 128 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, and/or other user interface devices configured to receive and/or convey user input. In some implementations, one or more user interfaces 128 may be included in one or more client computing platforms 104. In some implementations, one or more user interfaces 128 may be included in system 100.

External resources 120 may include sources of information outside of system 100, external entities participating with system 100, and/or other resources. In some implementations, external resources 120 may include a provider of documents, including but not limited to electronic source documents 123, from which system 100 and/or its components (e.g., source component 108) may obtain documents. In some implementations, external resources 120 may include a provider of information, including but not limited to extracted information 125, from which system 100 and/or its components (e.g., relevance component 110) may obtain information and/or documents. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, some or all of the functionality attributed herein to server 102 and/or system 100 may be provided by resources included in one or more client computing platform(s) 104.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 114, and/or 116, and/or other components. Processor(s) 124 may be configured to execute components 108, 110, 112, 114, and/or 116, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 124 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 124 may be configured to execute one or more additional components that may perform some or all of the functionality attributed below to one of components 108, 110, 112, 114, and/or 116.

FIG. 2 illustrates a method 200 of providing user interfaces to converse with a corpus of electronic documents via a large language model, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202, a presentation of a first user interface is effectuated, the first user interface being configured to obtain entry of user input from a user to (i) select one or more documents to be provided as input to a large language model for a particular conversation between the user and the one or more documents, (ii) enter queries regarding the one or more documents that have been selected, and (iii) navigate between a set of different portions of the first user interface. The set of different portions includes (a) a first portion configured to select, by the user, an individual conversation from a set of conversations, (b) a second portion configured to enter, by the user, an individual query and present, to the user, an individual reply to the individual query, (c) a third portion configured to select, by the user, an individual document from the one or more documents for presentation in a fourth portion, and (d) the fourth portion configured to present, to the user, the individual document as either (1) selected in the third portion, or (2) determined to be relevant to the individual reply. The set of conversations includes the particular conversation. In some embodiments, operation 202 is performed by a presentation component the same as or similar to presentation component 116 (shown in FIG. 1 and described herein).

At an operation 204, responsive to selection of the individual conversation, the individual query is provided as a prompt to the large language model. In some embodiments, operation 204 is performed by a model component the same as or similar to model component 112 (shown in FIG. 1 and described herein).

At an operation 206, the individual reply is obtained from the large language model. The individual reply is presented in the first user interface. In some embodiments, operation 206 is performed by a model component the same as or similar to model component 112 (shown in FIG. 1 and described herein).

At an operation 208, the individual document is determined from the one or more documents that is relevant to the individual reply. In some embodiments, operation 208 is performed by a relevance component the same as or similar to relevance component 110 (shown in FIG. 1 and described herein).

At an operation 210, the individual document is presented in the fourth portion of the first user interface. In some embodiments, operation 210 is performed by a presentation component the same as or similar to presentation component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for providing user interfaces for users to textually converse with a corpus of electronic documents via a large language model, wherein the large language model has been trained on at least a million documents, wherein the large language model includes a neural network using over a billion parameters and/or weights, the system comprising:

one or more hardware processors configured by machine-readable instructions to:

effectuate a presentation of a first user interface, the first user interface being configured to obtain entry of user input from a user to:

(i) select multiple documents to be provided as input to a large language model for a particular textual conversation between the user and the multiple documents, wherein the multiple documents form the corpus of electronic documents, (ii) enter queries regarding the multiple documents that have been selected, and (iii) navigate between a set of different portions of the first user interface, wherein the set of different portions includes:

(a) a first portion configured to select, by the user, an individual textual conversation from a set of textual conversations that are selectable, wherein the set of textual conversations includes the particular textual conversation, (b) a second portion configured to enter, by the user, an individual query and present, to the user, an individual reply to the individual query, (c) a third portion configured to select, by the user, an individual document from the multiple documents for presentation in a fourth portion, and (d) the fourth portion configured to present, to the user, at least part of the individual document as both (1) selected in the third portion and (2) determined to be relevant to the individual reply;

responsive to selection of the individual textual conversation, provide the individual query as a prompt to the large language model;

obtain the individual reply from the large language model, wherein the individual reply is presented in the second portion of the first user interface;

determine the individual document from the multiple documents that is relevant to the individual reply; and present the individual document in the fourth portion of the first user interface, wherein a segment in the individual document that is relevant to the individual reply is emphasized in the fourth portion of the first user interface.

2. The system of claim 1, wherein the second portion is specific to the individual textual conversation from the set of textual conversations that has been selected through the first portion of the first user interface.

3. The system of claim 1, wherein the second portion presents modifications to the corpus of electronic documents.

4. The system of claim 1, wherein the second portion indicates whether the individual query was scoped to a subset of the corpus of electronic documents.

5. The system of claim 1, wherein the large language model is modeled such that the individual reply is limited in scope to one or more statements that have support in the corpus of electronic documents.

6. The system of claim 1, wherein the large language model is based on or derived from Generative Pre-trained Transformer 3 (GPT3).

7. The system of claim 1, wherein the second portion indicates a subset of the corpus of electronic documents determined to be relevant to the individual reply, wherein the subset includes the individual document.

8. The system of claim 1, wherein the individual reply is formatted for presentation based on the individual query.

9. The system of claim 1, wherein the segment in the individual document that is relevant to the individual reply is emphasized in the fourth portion of the first user interface by an indicator that indicates provenance of the individual reply.

10. The system of claim 1, wherein at least some parts of the first portion, the second portion, the third portion, and the fourth portion are presented to the user at the same time.

11. A method of providing user interfaces to users to textually converse with a corpus of electronic documents via a large language model, wherein the large language model has been trained on at least a million documents, wherein the large language model includes a neural network using over a billion parameters and/or weights, the method comprising:

effectuating a presentation of a first user interface, the first user interface being configured to obtain entry of user input from a user to (i) select multiple documents to be provided as input to a large language model for a particular textual conversation between the user and the multiple documents, wherein the multiple documents form the corpus of electronic documents, (ii) enter queries regarding the multiple documents that have been selected, and (iii) navigate between a set of different portions of the first user interface, wherein the set of different portions includes (a) a first portion configured to select, by the user, an individual textual conversation from a set of textual conversations that are selectable, wherein the set of textual conversations includes the particular textual conversation, (b) a second portion configured to enter, by the user, an individual query and present, to the user, an individual reply to the individual query, (c) a third portion configured to select, by the user, an individual document from the multiple documents for presentation in a fourth portion, and (d) the fourth portion configured to present, to the user, at least part of the individual document as both (1) selected in the third portion and (2) determined to be relevant to the individual reply;

responsive to selection of the individual textual conversation, providing the individual query as a prompt to the large language model;

obtaining the individual reply from the large language model, wherein the individual reply is presented in the second portion of the first user interface;

determining the individual document from the multiple documents that is relevant to the individual reply; and presenting the individual document in the fourth portion of the first user interface, wherein a segment in the individual document that is relevant to the individual reply is emphasized in the fourth portion of the first user interface.

12. The method of claim 11, wherein the second portion is specific to the individual textual conversation from the set of textual conversations that has been selected through the first portion of the first user interface.

13. The method of claim 11, wherein the second portion presents modifications to the corpus of electronic documents.

14. The method of claim 11, wherein the second portion indicates whether the individual query was scoped to a subset of the corpus of electronic documents.

15. The method of claim 11, wherein the large language model is modeled such that the individual reply is limited in scope to one or more statements that have support in the corpus of electronic documents.

16. The method of claim 11, wherein the large language model is based on or derived from Generative Pre-trained Transformer 3 (GPT3).

17. The method of claim 11, wherein the second portion indicates a subset of the corpus of electronic documents determined to be relevant to the individual reply, wherein the subset includes the individual document.

18. The method of claim 11, wherein the individual reply is formatted for presentation based on the individual query.

19. The method of claim 11, wherein the segment in the individual document that is relevant to the individual reply is emphasized in the fourth portion of the first user interface by an indicator that indicates provenance of the individual reply.

20. The method of claim 11, wherein at least some parts of the first portion, the second portion, the third portion, and the fourth portion are presented to the user at the same time.

* * * * *